US012666146B2

(12) United States Patent
Pu et al.

(10) Patent No.: US 12,666,146 B2
(45) Date of Patent: Jun. 23, 2026

(54) CONTROL PARAMETER ADJUSTMENT METHOD OF LENS AND ELECTRONIC DEVICE

(71) Applicant: ASUSTeK COMPUTER INC., Taipei City (TW)

(72) Inventors: Hsin-Yi Pu, Taipei City (TW); Lai-Peng Wong, Taipei City (TW); Pei-Chun Meng, Taipei City (TW); Ching Hsuan Chen, Taipei City (TW); Chang-Yi Chen, Taipei City (TW)

(73) Assignee: ASUSTek COMPUTER INC., Taipei City (TW)

( * ) Notice: Subject to any disclaimer, the term of this patent is extended or adjusted under 35 U.S.C. 154(b) by 260 days.

(21) Appl. No.: 17/982,537

(22) Filed: Nov. 8, 2022

(65) Prior Publication Data

US 2023/0403465 A1 Dec. 14, 2023

(30) Foreign Application Priority Data

Jun. 13, 2022 (TW) .................................. 111121805

(51) Int. Cl.
H04N 23/67 (2023.01)
G03B 13/36 (2021.01)

(52) U.S. Cl.
CPC ............. H04N 23/67 (2023.01); G03B 13/36 (2013.01)

(58) Field of Classification Search
CPC .... H04N 23/67; H04N 23/631; H04N 23/632; H04N 23/633; H04N 23/667; G03B 13/36
See application file for complete search history.

(56) References Cited

U.S. PATENT DOCUMENTS

| 7,324,151 | B2 * | 1/2008 | Onozawa | ............. | H04N 23/673 |
| | | | | | 348/346 |
| 8,350,945 | B2 * | 1/2013 | Yumiki | ................ | H04N 23/673 |
| | | | | | 348/346 |
| 9,716,825 | B1 * | 7/2017 | Manzari | ............... | H04N 23/634 |
| 11,943,530 | B2 * | 3/2024 | Hwang | ............... | G06F 3/04845 |

(Continued)

FOREIGN PATENT DOCUMENTS

| CN | 306284923 | 1/2021 |
| CN | 112738401 | 4/2021 |
| CN | 111935394 | 1/2022 |

*Primary Examiner* — Shahbaz Nazrul
(74) *Attorney, Agent, or Firm* — JCIPRNET

(57) ABSTRACT

A control parameter adjustment method of lens includes: capturing an external image through a lens of an electronic device, and presenting an image screen corresponding to the external image through a display; receiving a first user operation through a user interface circuit; in response to the first user operation, activating a first parameter adjustment mode corresponding to the lens and providing a first parameter adjustment interface adjusting a control parameter of the lens based on a first virtual scale; in the first parameter adjustment mode, receiving a second user operation through the user interface circuit; and in response to the second user operation, activating a second parameter adjustment mode corresponding to the lens and providing a second parameter adjustment interface adjusting the control parameter of the lens based on a second virtual scale, and the first virtual scale is different from the second virtual scale.

16 Claims, 6 Drawing Sheets

(56)             References Cited

U.S. PATENT DOCUMENTS

| | | | |
|---|---|---|---|
| 2014/0368719 A1* | 12/2014 | Kaneko | H04N 23/672 |
| | | | 348/333.02 |
| 2015/0074573 A1* | 3/2015 | Teshima | G06F 3/04847 |
| | | | 715/765 |
| 2019/0394409 A1* | 12/2019 | Matsumoto | H04N 23/63 |
| 2023/0269459 A1* | 8/2023 | Liu | H04N 23/67 |
| | | | 348/333.03 |
| 2023/0379570 A1* | 11/2023 | Emori | G03B 17/18 |
| 2024/0073529 A1* | 2/2024 | Lee | H04N 23/61 |

* cited by examiner

CONTROL PARAMETER ADJUSTMENT METHOD OF LENS AND ELECTRONIC DEVICE

CROSS-REFERENCE TO RELATED APPLICATION

This application claims the priority benefit of Taiwan application serial no. 111121805, filed on Jun. 13, 2022. The entirety of the above-mentioned patent application is hereby incorporated by reference herein and made a part of this specification.

BACKGROUND

Field of the Disclosure

The present disclosure relates to a method for adjusting control parameters of a lens and an electronic device using the method.

Description of Related Art

As the total number of lenses configured in smart phones increases, the performance of photographic function of smart phones is also continuously improved. In addition, the camera modules of most smart phones also support manual zooming, manual white balance or manual brightness adjustment, etc., and therefore, users can adjust the control parameters of the lens according to current needs of photographic function during the process of taking photos or videos with a smart phone. However, when adjusting the focal length, white balance or brightness of the lens of a smart phone, the adjustment is made mostly through a single adjustment interface (such as a single scale). Users cannot choose to make coarse or fine adjustments to specific control parameters according to their current needs, which affects the user experience. In addition, as the number of lenses configured on electronic devices such as smart phones increases, the focal lengths of the lenses are also elongated. Therefore, if the focal length of the lens can only be adjusted based on a single adjustment interface (e.g., a single scale), the adjustment efficiency will be significantly reduced.

SUMMARY OF THE DISCLOSURE

According to the first aspect of this disclosure, a control parameter adjustment method of a lens is provided. The control parameter adjustment method is applied to an electronic device with a lens, a display and an operation interface circuit. The control parameter adjustment method includes: capturing an external image through the lens, and presenting an image screen corresponding to the external image through the display; receiving a first user operation through an operation interface circuit; in response to the first user operation, activating a first parameter adjustment mode corresponding to the lens and providing a first parameter adjustment interface which is configured to adjust a control parameter of the lens based on a first virtual scale; in the first parameter adjustment mode, receiving a second user operation through the operation interface circuit; and in response to the second user operation, activating a second parameter adjustment mode corresponding to the lens and providing a second parameter adjustment interface which is configured to adjust the control parameter of the lens based on a second virtual scale, and the first virtual scale is different from the second virtual scale.

According to the second aspect of this disclosure, an electronic device is provided. The electronic device includes a lens, a display, an operation interface circuit and a processor. The processor is coupled to the lens, the display and the operation interface circuit. The processor is configured to: capture an external image through the lens, and present an image screen corresponding to the external image through the display; receive a first user operation through the operation interface circuit; in response to the first user operation, activate a first parameter adjustment mode corresponding to the lens and provide a first parameter adjustment interface, and the first parameter adjustment interface is configured to adjust the control parameter of the lens based on a first virtual scale; receive a second user operation through the operation interface circuit in the first parameter adjustment mode; in response to the second user operation, activate a second parameter adjustment mode corresponding to the lens and provide a second parameter adjustment interface, and the second parameter adjustment interface is configured to adjust the control parameter of the lens based on a second virtual scale, and the first virtual scale is different from the second virtual scale.

Based on the above, the embodiments of the present disclosure provide different parameter adjustment interfaces for the same control parameter of the lens according to the user's operation requirements. In particular, different virtual scales may be adopted for different parameter adjustment interfaces. In this manner, the efficiency of making adjustment to at least part of the control parameters used by the lens may be improved for the user.

DESCRIPTION OF EMBODIMENTS

Figure 1:
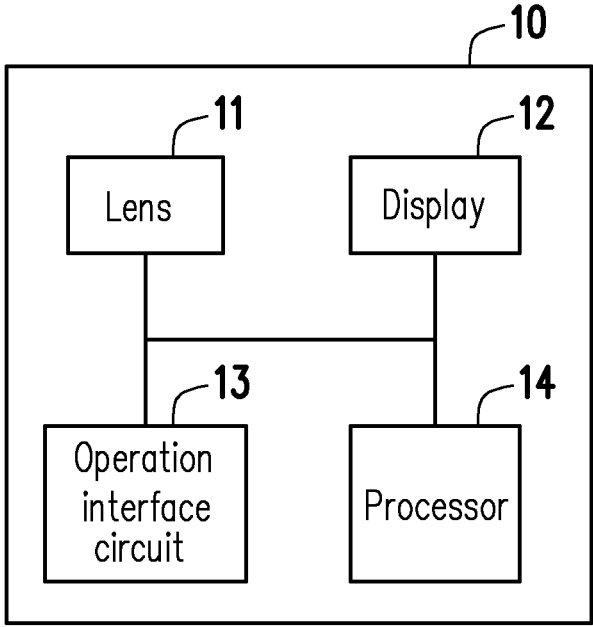
FIG. 1 is a schematic view of an electronic device according to an embodiment of the present disclosure.

FIG. 1 is a schematic view of an electronic device according to an embodiment of the present disclosure. Referring to FIG. 1, the electronic device 10 may include various electronic devices with an image capturing function, such as a smart phone, a tablet computer, a game console, or a camera device, and the type of the electronic device 10 is not limited thereto.

The electronic device 10 includes a lens 11, a display 12, an operation interface circuit 13, and a processor 14. The lens 11 may be configured to capture external images. For example, the lens 11 may include one or more optical lenses. In an embodiment, the lens 11 may also refer to a camera module or an image capturing module including the lens 11.

The display 12 is configured to present image screens. In particular, during the process of capturing the external image by the lens 11, the display 12 may present the image screen corresponding to the external image in real time. For example, the display 12 may include various types of displays such as a plasma display panel, a liquid-crystal display (LCD), a thin film transistor liquid crystal display (TFT-LCD), an organic light-emitting diode (OLED) display, or an LED display.

The operation interface circuit 13 is configured to receive user operations. In an embodiment, the operation interface circuit 13 includes a touch screen of the display 12. Therefore, the operation interface circuit 13 may receive touch operations such as single-click, double-click, long-press or slide performed by an input tool such as a user's finger on the touch screen of the display 12. Alternatively, in an embodiment, the operation interface circuit 13 includes physical buttons disposed on the electronic device 10. For example, the physical button may include a power button or a volume button of the electronic device 10. Therefore, the operation interface circuit 13 may receive the user's touch or press operation on the physical button. In addition, the operation interface circuit 13 may also include other types of various signal input circuits, which are not limited in the present disclosure.

The processor 14 is coupled to the lens 11, the display 12 and the operation interface circuit 13. The processor 14 may be in charge of all or part of the operation of the electronic device 10. For example, the processor 14 may include a central processing unit (CPU), or other programmable general-purpose or special-purpose microprocessors, digital signal processors (DSP), programmable controllers, application specific integrated circuits (ASICs), programmable logic devices (PLDs) or other similar devices or combinations of these devices. In addition, the electronic device 10 may further include a storage circuit, a power management circuit, a wireless communication circuit and/or various input/output (I/O) circuits.

The processor 14 may capture an external image through the lens 11, and present the image screen corresponding to the external image through the display 12. For example, the processor 14 may instruct the display 12 to present an image screen corresponding to the external image captured by the lens 11 in real time. The processor 14 may receive a user operation (also referred to as a first user operation) through the operation interface circuit 13. In response to the first user operation, the processor 14 may activate a parameter adjustment mode (also referred to as a first parameter adjustment mode) corresponding to the lens 11. In the first parameter adjustment mode, the processor 14 may provide a parameter adjustment interface (also referred to as a first parameter adjustment interface). In particular, the first parameter adjustment interface may be configured to adjust the control parameters of the lens 11 based on a virtual scale (also referred to as a first virtual scale).

On the other hand, in the first parameter adjustment mode, the processor 14 may receive another user operation (also referred to as a second user operation) through the operation interface circuit 13. In response to the second user operation, the processor 14 may activate another parameter adjustment mode (also referred to as a second parameter adjustment mode) corresponding to the lens 11. In the second parameter adjustment mode, the processor 14 may provide another parameter adjustment interface (also referred to as a second parameter adjustment interface). In particular, the second parameter adjustment interface may be configured to adjust the control parameter of the lens 11 based on another virtual scale (also referred to as a second virtual scale), and the first virtual scale is different from the second virtual scale.

In an embodiment, the control parameter may include a focal length parameter. The focal length parameter may be configured to control the focal length of the lens 11. For example, by adjusting the focal length parameters, the focal length of the lens 11 for capturing external images may be adjusted correspondingly. In an embodiment, the control parameter may further include a white balance parameter or a brightness parameter. By adjusting the white balance parameter, the white balance of the lens 11 for capturing external images may be adjusted correspondingly. By adjusting the brightness parameter, the brightness of the lens 11 for capturing external images may be adjusted correspondingly. In addition, the control parameter may further include any of various system parameters that may be used to control the lens 11 to dynamically capture external images, which are not limited in the present disclosure.

It should be noted that the first parameter adjustment interface (or the first virtual scale) and the second parameter adjustment interface (or the second virtual scale) are configured to adjust the same control parameter of the lens 11. For example, in the following embodiments, the control parameter is exemplified as a focal length parameter, but the present disclosure is not limited thereto.

In an embodiment, the first parameter adjustment interface may be configured for making coarse adjustment of the control parameters, and the second parameter adjustment interface may be configured for making fine adjustment of the control parameters. In an embodiment, a width (also referred to as the first interval width) of the interval between two scale units in the first virtual scale is smaller than a width (also referred to as the second interval width) of the interval between two scale units in the second virtual scale.

In an embodiment, in the first parameter adjustment mode, the processor 14 may present the first virtual scale on the image screen currently presented by the display 12 through the display 12. Therefore, in the first parameter adjustment mode, the user may perform user operations on the first parameter adjustment interface according to the first virtual scale presented on the display 12 to adjust the control parameter. Similarly, in the second parameter adjustment mode, the processor 14 may present the second virtual scale on the image screen currently presented by the display 12 through the display 12. In this manner, in the second parameter adjustment mode, the user may perform user operation on the second parameter adjustment interface according to the second virtual scale displayed on the display 12 to adjust the control parameter.

Figure 2:
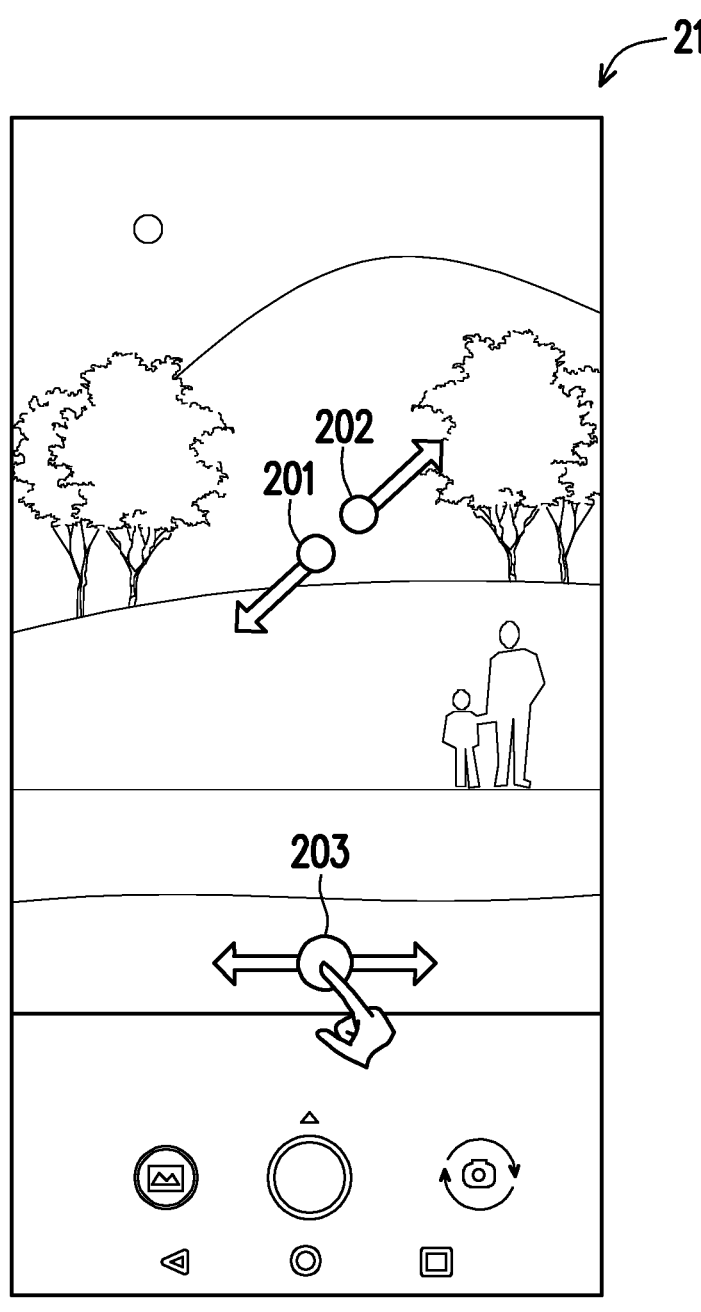
FIG. 2 is a schematic view of activating a first parameter adjustment mode according to an embodiment of the present disclosure.

FIG. 2 is a schematic view of activating a first parameter adjustment mode according to an embodiment of the present disclosure. Referring to FIG. 1 and FIG. 2, it is assumed that the operation interface circuit 13 includes a touch screen 21. The touch screen 21 may be integrated into the display 12. The touch screen 21 may present a corresponding display screen according to the external image captured by the lens 11. In addition, the touch screen 21 may be configured to receive the user's touch operation.

In an embodiment, the user may perform a specific user operation (i.e., the first user operation) on the touch screen 21 to activate the first parameter adjustment mode while the lens 11 continues to capture external images. For example, the first user operation may include sliding user's two fingers in opposite directions at positions 201 and 202 (similar to the operation of zooming in the image screen presented on the touch screen 21). Alternatively, the first user operation may also include sliding the user's finger left or right at position 203. For example, the touch screen 21 may present a control object at the position 203. The control object may be configured to activate the first parameter adjustment mode. Alternatively, the control object may also be configured to perform other operation functions, which is not limited in the present disclosure. In addition, the first user operation may also include other operation gestures, which are not limited in the present disclosure. In response to the first user operation, the first parameter adjustment mode may be activated.

Figure 3:
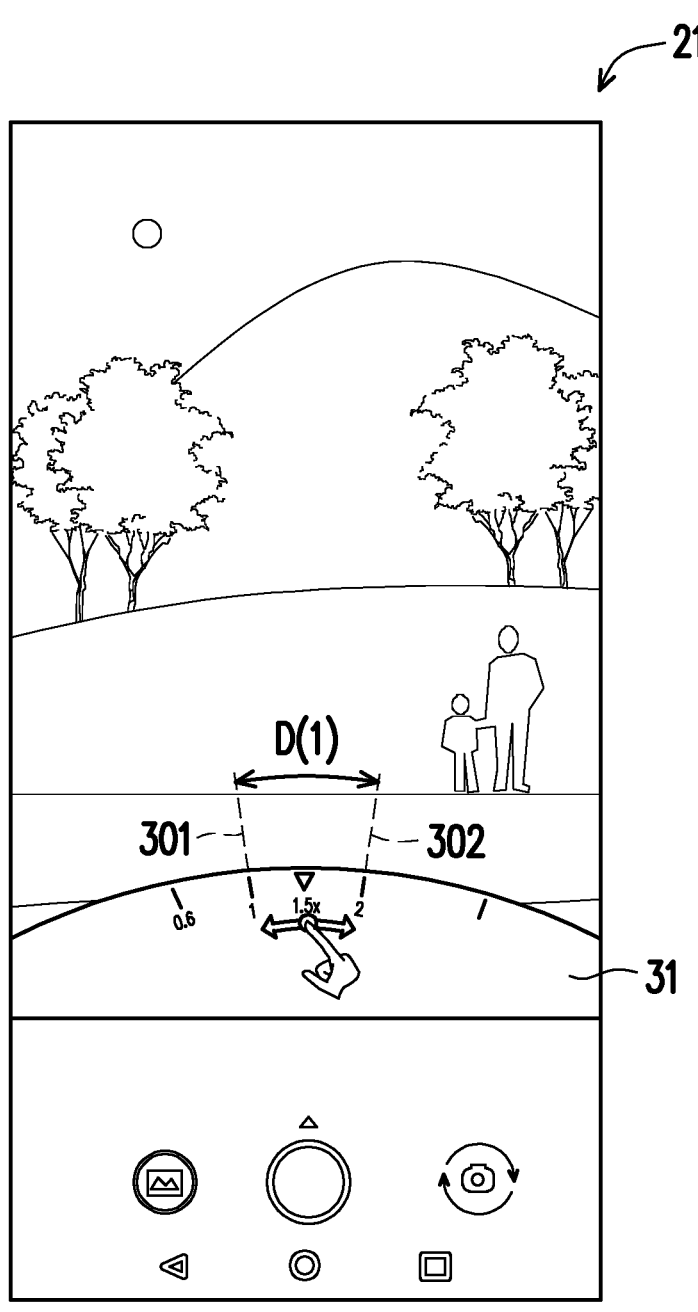
FIG. 3 is a schematic view of a first parameter adjustment interface according to an embodiment of the present disclosure.

FIG. 3 is a schematic view of a first parameter adjustment interface according to an embodiment of the present disclosure. Referring to FIG. 3, following the embodiment of FIG. 2, after the first parameter adjustment mode is activated, the touch screen 21 may present the virtual scale 31 (i.e., the first virtual scale) in the first parameter adjustment interface. For example, the virtual scale 31 may be superimposed or suspended on the current display screen of the touch screen 21.

The virtual scale 31 may have multiple scale units. Each scale unit may correspond to a parameter value of the control parameter. The user may adjust the control parameter (e.g., the focal length parameter) according to the virtual scale 31 to instantly change the focal length of the lens 11. Taking FIG. 3 as an example, the scale units on the virtual scale 31 are "0.5", "1", "1.5" and "2" respectively from left to right, corresponding to 0.5× focal length, 1× focal length, 1.5× focal length and 2× focal length of lens 11 respectively, and so on.

In the process of adjusting the control parameter (e.g., the focal length parameter), the user may determine the focal length parameter currently used by the lens 11 according to an index on the virtual scale 31. Taking FIG. 3 as an example, it is assumed that the scale unit on the virtual scale 31 pointed to by the index is "1.5", which means that the focal length parameter currently adopted by the lens 11 is 1.5 times the focal length. In addition, the width (or distance) of the interval between two scale units 301 and 302 in the virtual scale 31 is D(1). It should be noted that the scale units 301 and 302 may be any two scale units in the virtual scale 31, and are not limited to the scale units "1" and "2" shown in FIG. 3.

Figure 4:
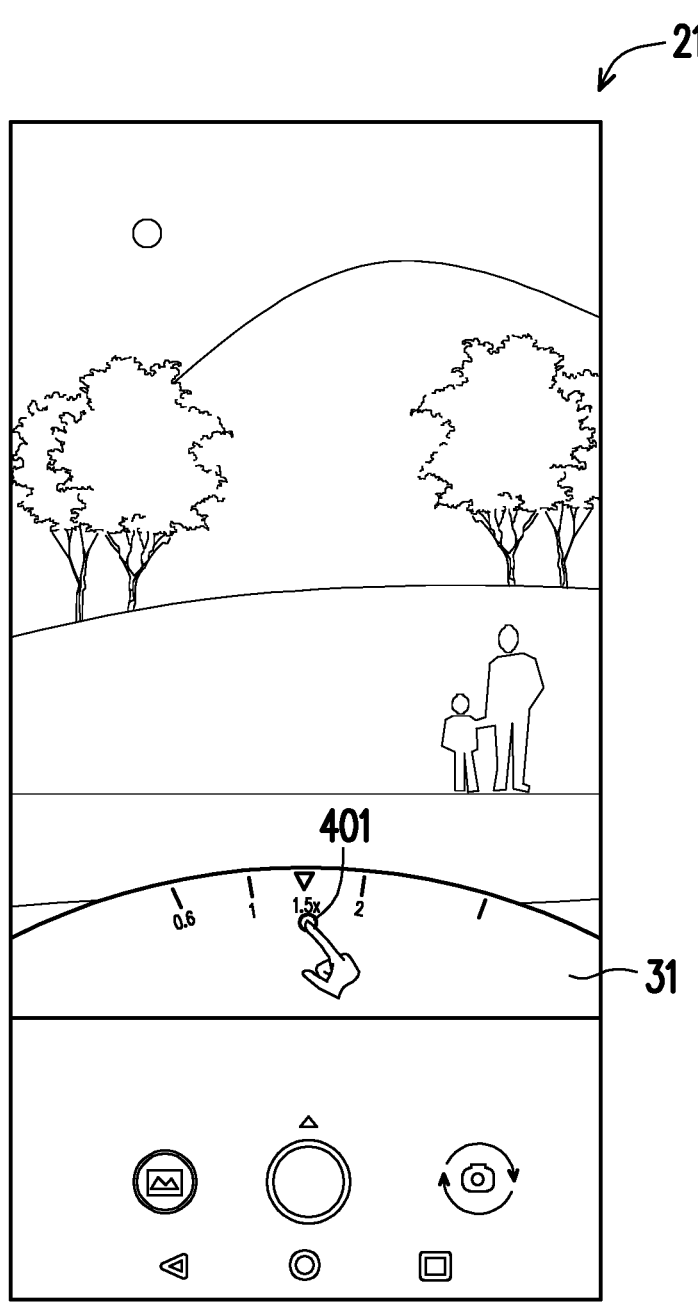
FIG. 4 is a schematic view of a second parameter adjustment mode according to an embodiment of the present disclosure.

FIG. 4 is a schematic view of a second parameter adjustment mode according to an embodiment of the present disclosure. Please refer to FIG. 4, following the embodiment of FIG. 3, in the first parameter adjustment mode, when the user wants to finely adjust the control parameter (for example, the focal length parameter) within a specific value range, the user may perform a specific user operation (i.e., the second user operation) on the touch screen 21 to activate the second parameter adjustment mode while the lens 11 continuously captures external images. For example, the second user operation may include long pressing the touch screen 21 with the user's finger to zoom in on a specific value range in the virtual scale 31. Taking FIG. 4 as an example, when the user's finger long presses the position 401 in the touch screen 21, the numerical range between the scale units "1" and "2" may be enlarged (because the position 401 is located between the scale units "1" and "2"). In addition, the second user operation may also include other operation gestures, which are not limited in the present disclosure. In response to the second user operation, the second parameter adjustment mode may be activated.

Figure 5:
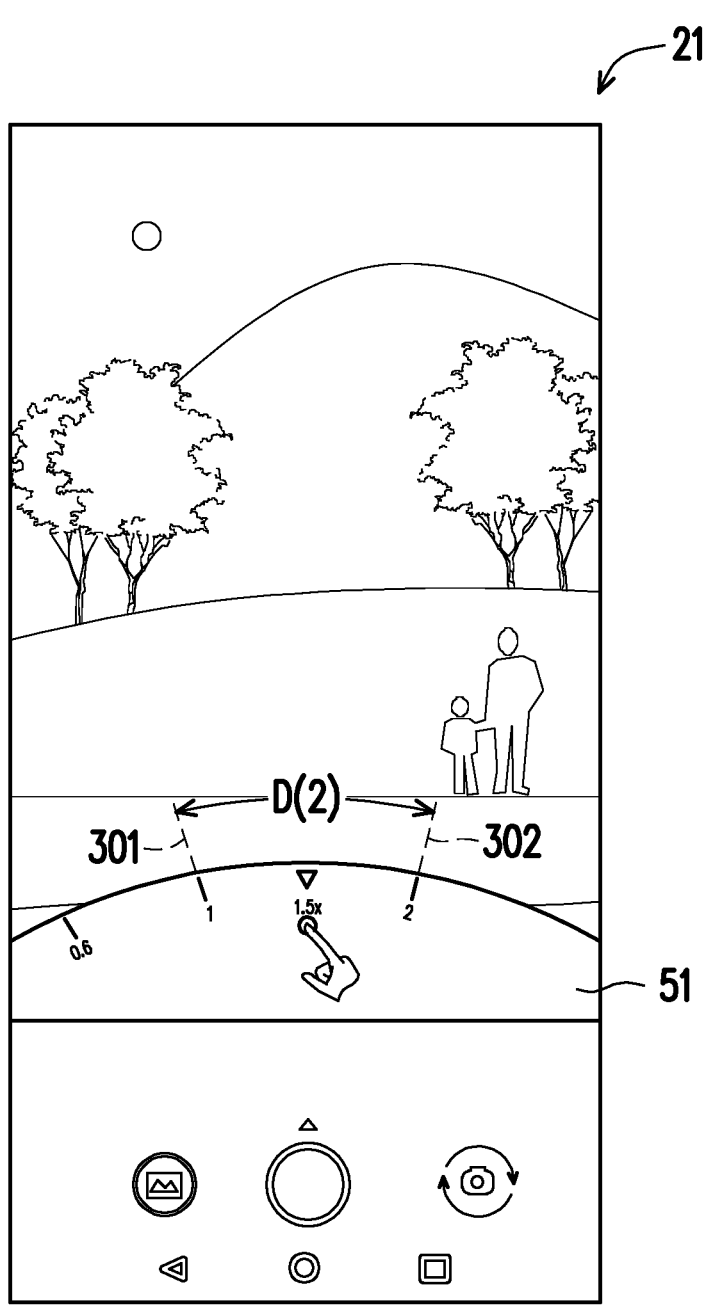
FIG. 5 is a schematic view of a second parameter adjustment interface according to an embodiment of the present disclosure.

FIG. 5 is a schematic view of a second parameter adjustment interface according to an embodiment of the present disclosure. Referring to FIG. 5, following the embodiment of FIG. 4, after the second parameter adjustment mode is activated, the touch screen 21 may present the virtual scale 51 (i.e., the second virtual scale) in the second parameter adjustment interface. For example, the virtual scale 51 may replace the original virtual scale 31 and be superimposed or suspended on the current display screen of the touch screen 21.

Similar to the virtual scale 31 of FIG. 3, the virtual scale 51 also has a plurality of scale units. Each scale unit may correspond to a parameter value of the control parameter. The user may adjust the control parameter (e.g., the focal length parameter) according to the virtual scale 51 to instantly change the focal length of the lens 11. However, compared with the virtual scale 31 of FIG. 3, the width (or distance) of the interval between two identical scale units 301 and 302 in the virtual scale 51 is D(2), and D(2) is greater than D(1).

From another perspective, in the process of switching from the first parameter adjustment interface (or virtual scale 31) of FIG. 3 to the second parameter adjustment interface (or virtual scale 51) of FIG. 5, the interval between two identical scale units (e.g., scale units 301 and 302) is enlarged (e.g., from D(1) to D(2)). Therefore, if the first parameter adjustment interface (or virtual scale 31) of FIG. 3 is compared with the second parameter adjustment interface (or virtual scale 51) of FIG. 5, the first parameter adjustment interface (or virtual scale 31) is more suitable for making relatively coarse and large-scale adjustment of the control parameter (for example, moving the index on the virtual scale 31 coarsely and widely across multiple scale units), while the second parameter adjustment interface (or virtual scale 51) is more suitable for making relatively fine and small-scale adjustment of the control parameter (for example, moving the index on the virtual scale 51 finely and narrowly between two specific scale units).

In an embodiment, by allowing the user to select the most suitable parameter adjustment mode to adjust the control parameter at the user's discretion, the efficiency for user to make adjustment of the control parameters may be effectively improved. For example, at the beginning of capturing an external image, the focal length of the lens 11 is still far from the optimal focal length of the target object to be captured. Therefore, the user may quickly adjust the focal length of the lens 11 to be near a position which is an optimal focal length for the target object through the first parameter adjustment mode (equivalent to performing a coarse adjustment of the focal length). After adjusting the focal length of the lens 11 to be near the position which is the optimal focal length for the target object, the user may further fine-tune the focal length of the lens 11 to the position which is the optimal focal length for the target object through the second parameter adjustment mode (equivalent to performing fine adjustment of focal length). It may be seen from the above that the efficiency of making adjustment to at least part of the control parameters used by the lens 11 may be improved for the user through coarse adjustment and fine adjustment in sequence.

In particular, as the number of lenses configured on electronic devices such as smart phones increases, the focal lengths of the lenses are also elongated. Therefore, through the above-mentioned focal length adjustment mechanism of making coarse adjustment and fine adjustment in sequence, the efficiency of manually focusing (or zooming) on the target object may be effectively improved, thereby improving user experience.

In an embodiment, in the first parameter adjustment mode, if a user operation instructing to adjust the control parameter is not received within a preset time range (also referred to as the first time range), the processor 14 may hide the first virtual scale. For example, the first time range may be 5 seconds or set otherwise. Similarly, in the second parameter adjustment mode, if the user operation instructing to adjust the control parameter is not received within a preset time range (also referred to as the second time range), the processor 14 may hide the second virtual scale. For example, the second time range may also be 5 seconds or set otherwise. In this way, when the user currently does not want to adjust the control parameters, it is possible to prevent the virtual scale from blocking the partial image screen presented by the display 12.

In an embodiment, in the second parameter adjustment mode, the processor 14 may receive another user operation (also referred to as a third user operation) through the operation interface circuit 13. In response to the third user operation, the processor 14 may restore the current parameter adjustment mode to the first parameter adjustment mode from the second parameter adjustment mode. For example, the third user operation may include an operation of sliding the user's fingers of both hands in the manner of pinching inward on the touch screen 21 in FIG. 5 (similar to the operation of zooming out the image screen presented on the touch screen 21) or other operation gestures, which are not limited in the present disclosure. In this manner, the operation flexibility of switching between a plurality of parameter adjustment modes may be further increased.

In an embodiment, the first virtual scale and/or the second virtual scale may not be presented in the display screen of the display 12. Alternatively, in an embodiment, the first virtual scale and/or the second virtual scale may be considered to be invisible or transparent. However, other descriptions about the first virtual scale and/or the second virtual scale are not affected by whether they are visually displayed or not.

Figure 6:
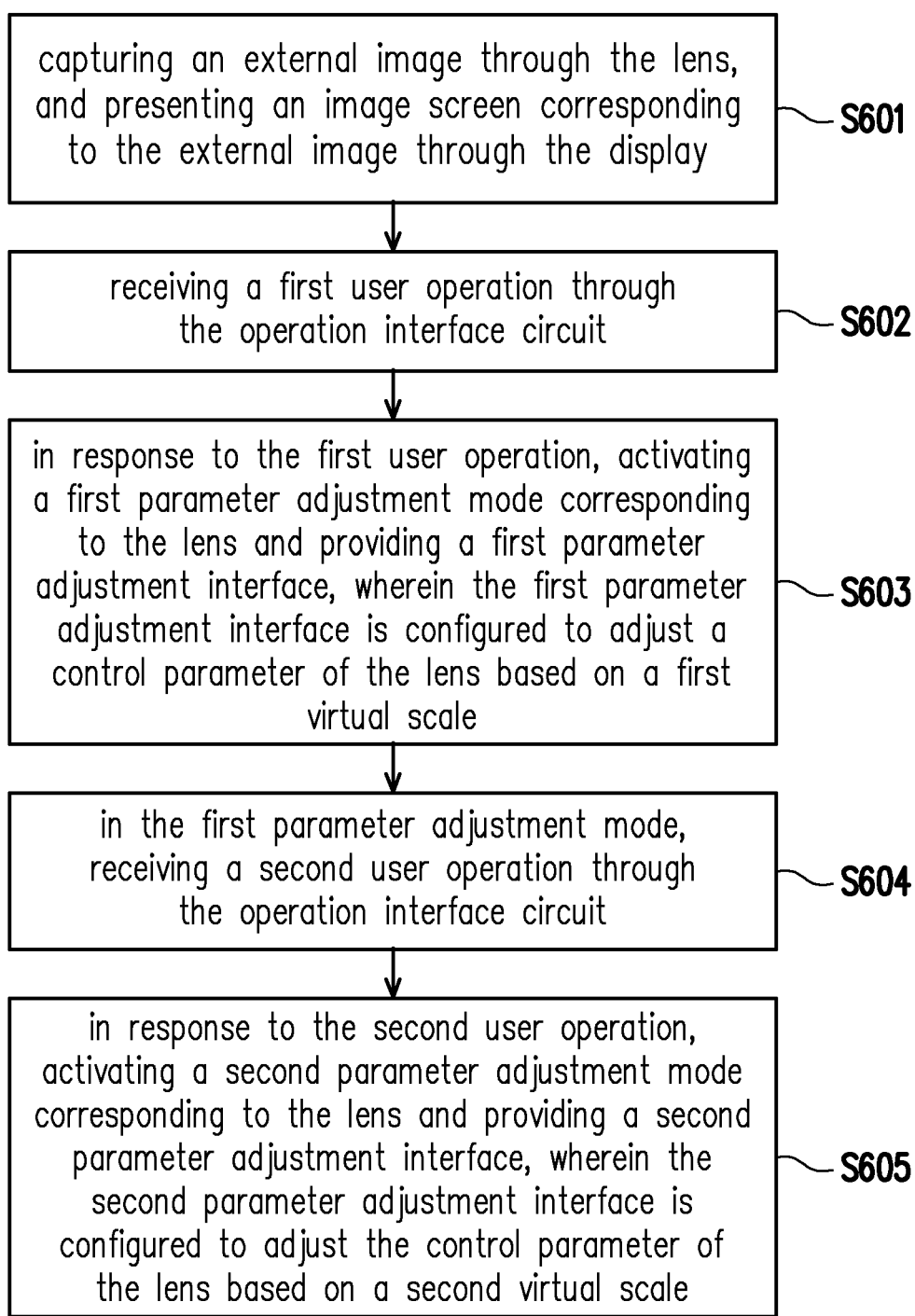
FIG. 6 is a flowchart of a method for adjusting a control parameter of a lens according to an embodiment of the present disclosure.

FIG. 6 is a flowchart of a method for adjusting a control parameter of a lens according to an embodiment of the present disclosure. Referring to FIG. 6, in step S601, an external image is captured through a lens, and an image screen corresponding to the external image is presented through a display. In step S602, a first user operation is received through an operation interface circuit. In step S603, in response to the first user operation, a first parameter adjustment mode corresponding to the lens is activated and a first parameter adjustment interface is provided, and the first parameter adjustment interface is configured to adjust the control parameter of the lens based on the first virtual scale. In step S604, in the first parameter adjustment mode, a second user operation is received through the operation interface circuit. In step S605, in response to the second user operation, a second parameter adjustment mode corresponding to the lens is activated and a second parameter adjustment interface is provided, and the second parameter adjustment interface is configured to adjust the control parameter of the lens based on the second virtual scale, and the first virtual scale is different from the second virtual scale.

However, each step in FIG. 6 has been described in detail as above, and will not be repeated here. Each step in FIG. 6 may be implemented as a plurality of codes or circuits, which is not limited in the present disclosure. In addition, the method of FIG. 6 may be used in conjunction with the above exemplary embodiments, and may also be used alone, which is not limited in the present disclosure.

To sum up, the embodiments of the present disclosure provide different parameter adjustment interfaces for the same control parameter of the lens according to the user's operation requirements. In particular, different virtual scales may be adopted for different parameter adjustment interfaces. In this manner, the efficiency of making adjustment to at least part of the control parameters used by the lens may be improved for the user, thereby improving the user experience.

Although the present disclosure has been described above with examples, it is not intended to limit the present disclosure. Anyone with ordinary knowledge in the technical field can make some changes and modifications without departing from the spirit and scope of the present disclosure. Therefore, the protection scope of the present disclosure shall be determined by the scope of the appended claims.

What is claimed is:

1. A control parameter adjustment method of a lens, which is applied to an electronic device, wherein the electronic device comprises a lens, a display and an operation interface circuit, the control parameter adjustment method comprising:

capturing an external image through the lens, and presenting an image screen corresponding to the external image through the display;

receiving a first user operation through the operation interface circuit;

in response to the first user operation, activating a first parameter adjustment mode corresponding to the lens and providing a first parameter adjustment interface, wherein the first parameter adjustment interface is configured to adjust a control parameter of the lens based on a first virtual scale;

in the first parameter adjustment mode, receiving a second user operation through the operation interface circuit;

obtaining an operation position of the second user operation on the display;

obtaining two target scale units in the first virtual scale from a plurality of scale units presented in the first parameter adjustment mode;

determining whether the operation position of the second user operation remains at a same position located between the two target scale units in the first virtual scale for a predetermined time period; and in response to determining that the operation position of the second user operation remains at the same position located between the two target scale units in the first virtual scale for the predetermined time period, enlarging an interval width between the two scale units in the first virtual scale, and activating a second parameter adjustment mode corresponding to the lens and providing a second parameter adjustment interface, wherein the second parameter adjustment interface is configured to adjust the control parameter of the lens based on a second virtual scale, and the first virtual scale is different from the second virtual scale.

2. The control parameter adjustment method of the lens according to claim 1, wherein the control parameter comprises a focal length parameter, and the focal length parameter is configured to control a focal length of the lens.

3. The control parameter adjustment method of the lens according to claim 1, wherein the first parameter adjustment interface is configured to make a coarse adjustment of the control parameter, and the second parameter adjustment interface is configured to make a fine adjustment of the control parameter.

4. The control parameter adjustment method of the lens according to claim 1, wherein a first interval width between the two scale units in the first virtual scale is smaller than a second interval width between the two scale units in the second virtual scale.

5. The control parameter adjustment method of the lens according to claim 1, further comprising:

presenting the first virtual scale on the image screen through the display in the first parameter adjustment mode; and presenting the second virtual scale on the image screen through the display in the second parameter adjustment mode.

6. The control parameter adjustment method of the lens according to claim 5, further comprising:

in the first parameter adjustment mode, if a user operation instructing to adjust the control parameter is not received within a first time range, hiding the first virtual scale; and in the second parameter adjustment mode, if the user operation instructing to adjust the control parameter is not received within a second time range, hiding the second virtual scale.

7. The control parameter adjustment method of the lens according to claim 1, further comprising:

receiving a third user operation through the operation interface circuit in the second parameter adjustment mode; and in response to the third user operation, restoring a current parameter adjustment mode to the first parameter adjustment mode from the second parameter adjustment mode.

8. The control parameter adjustment method of the lens according to claim 1, wherein the operation interface circuit comprises a touch screen of the display or a physical button of the electronic device.

9. An electronic device, comprising:

a lens;

a display;

an operation interface circuit; and a processor, which is coupled to the lens, the display and the operation interface circuit, wherein the processor is configured to:

capture an external image through the lens, and present an image screen corresponding to the external image through the display;

receive a first user operation through the operation interface circuit;

in response to the first user operation, activate a first parameter adjustment mode corresponding to the lens and provide a first parameter adjustment interface, wherein the first parameter adjustment interface is configured to adjust a control parameter of the lens based on a first virtual scale;

receive a second user operation through the operation interface circuit in the first parameter adjustment mode;

obtain an operation position of the second user operation on the display;

obtain two target scale units in the first virtual scale from a plurality of scale units presented in the first parameter adjustment interface;

determine whether the operation position of the second user operation remains at a same position located between the two target scale units in the first virtual scale for a predetermined time period; and in response to determining that the operation position of the second user operation remains at the same position located between the two target scale units in the first virtual scale for the predetermined time period, enlarge an interval width between the two scale units in the first virtual scale, and activate a second parameter adjustment mode corresponding to the lens and provide a second parameter adjustment interface, wherein the second parameter adjustment interface is configured to adjust the control parameter of the lens based on a second virtual scale, and the first virtual scale is different from the second virtual scale.

10. The electronic device according to claim 9, wherein the control parameter comprises a focal length parameter, and the focal length parameter is configured to control a focal length of the lens.

11. The electronic device according to claim 9, wherein the first parameter adjustment interface is configured to make a coarse adjustment of the control parameter, and the second parameter adjustment interface is configured to make a fine adjustment of the control parameter.

12. The electronic device according to claim 9, wherein a first interval width between the two scale units in the first virtual scale is smaller than a second interval width between the two scale units in the second virtual scale.

13. The electronic device according to claim 9, wherein the processor is further configured to:

present the first virtual scale on the image screen through the display in the first parameter adjustment mode; and present the second virtual scale on the image screen through the display in the second parameter adjustment mode.

14. The electronic device according to claim 13, wherein the processor is further configured to:

in the first parameter adjustment mode, if a user operation instructing to adjust the control parameter is not received within a first time range, hide the first virtual scale; and in the second parameter adjustment mode, if the user operation instructing to adjust the control parameter is not received within a second time range, hide the second virtual scale.

15. The electronic device according to claim 9, wherein the processor is further configured to:

receive a third user operation through the operation interface circuit in the second parameter adjustment mode; and in response to the third user operation, restore a current parameter adjustment mode to the first parameter adjustment mode from the second parameter adjustment mode.

16. The electronic device according to claim 9, wherein the operation interface circuit comprises a touch screen of the display or a physical button of the electronic device.

* * * * *